United States Patent [19]

Eisen et al.

[11] Patent Number: 5,587,117
[45] Date of Patent: Dec. 24, 1996

[54] PROCESS FOR INSULATING PIPES USING POLYURETHANE RIGID FOAMS BY THE ROTATIONAL CASTING PROCESS

[75] Inventors: Norbert Eisen, Köln; Lutz-Peter Godthardt, Leverkusen; Peter Haas, Haan, all of Germany

[73] Assignee: Bayer Aktiengesellschaft, Leverkusen, Germany

[21] Appl. No.: 382,813

[22] Filed: Feb. 3, 1995

[30] Foreign Application Priority Data

Feb. 17, 1994 [DE] Germany .................. 44 05 061.5

[51] Int. Cl.⁶ .................. B29C 44/06; B29C 44/12
[52] U.S. Cl. .................. 264/45.7; 264/46.9; 264/53; 264/255; 264/331.16
[58] Field of Search .................. 264/45.7, 46.9, 264/255, 51, 53, 331.16

[56] References Cited

U.S. PATENT DOCUMENTS

| | | | |
|---|---|---|---|
| 3,635,908 | 1/1972 | Vogt et al. | 528/62 |
| 3,797,981 | 3/1974 | Van Dijk | 264/45.7 |
| 4,189,544 | 2/1980 | Thompson | 521/128 |
| 4,371,629 | 2/1983 | Austin | 521/115 |
| 4,499,038 | 2/1983 | Schafer et al. | 264/51 |
| 4,500,656 | 2/1985 | Rassohofer et al. | 521/164 |
| 4,645,630 | 2/1987 | Rasshofer et al. | 264/54 |
| 4,735,970 | 4/1988 | Sommerfeld et al. | 521/128 |
| 5,089,561 | 2/1992 | Forgione et al. | 525/127 |
| 5,470,515 | 11/1995 | Grimm et al. | 264/45.7 |

FOREIGN PATENT DOCUMENTS

| | | |
|---|---|---|
| 2121556 | 8/1972 | France . |
| 3305808 | 9/1983 | Germany .................. 264/45.7 |
| 4118362 | 12/1992 | Germany . |
| 49-18980 | 2/1974 | Japan .................. 264/45.7 |
| 49-52265 | 5/1974 | Japan .................. 264/45.7 |
| 58-183229 | 10/1983 | Japan .................. 264/45.7 |

*Primary Examiner*—Allan R. Kuhns
*Attorney, Agent, or Firm*—Joseph C. Gil

[57] ABSTRACT

The invention relates to a process for insulating pipes by applying a rigid polyurethane foam as an insulating layer and optionally an external top coating by the rotational casting process. The rigid polyurethane foam is obtained by a) an aromatic polyisocyanate, b) an organic polyhydroxyl compound, c) an aliphatic, cycloaliphatic or aromatic polyamine and/or polyimine having a molecular weight of from 32 to 1,000 as the cross linking agent in the presence d) a blowing agent, and optionally in the presence of e) known auxiliary substances and additives and in the presence of f) one or more compounds having a molecular weight of from about 166 to about 1,000 and being of the general formula

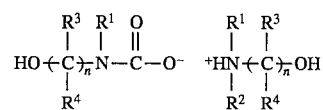

wherein n represents an integer between 2 and 9, preferably 2 and 3, $R^1$ signifies hydrogen, a $C_1$–$C_9$ alkyl radical or a

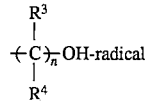

$R^2$ signifies hydrogen, and $R^3$ and $R^4$ signify hydrogen or methyl.

11 Claims, No Drawings

PROCESS FOR INSULATING PIPES USING POLYURETHANE RIGID FOAMS BY THE ROTATIONAL CASTING PROCESS

BACKGROUND OF THE INVENTION

The insulation of pipes using rigid polyurethane foams by the technique of rotational casting is known, for example, from German Offenlegungschrift 4,118,362. In practice, however, the formulations used are greatly in need of improvement. Extreme demands are made on the reaction mixtures in connection with the rotational casting process. On one hand, the reacting foaming material must still rise sufficiently against the rotating tube and flow as a single strand. On the other hand, it must not flow off the tube or from the applicator nozzle at the beginning due to inadequate cross-linking. This is further aggravated by the fact that the result is to be a dimensionally stable foamed material having an almost uncorrugated surface, whereon a thermoplastic top coating is frequently applied. In the case of undulating surfaces, the top coating flows into the troughs of the waves, whereby a thinner top coating forms on the crest of the waves. Not only is an optically uneven top coating obtained, but the mechanical endurance and the barrier behavior against diffusion also suffer.

The bonding of the foamed material to the pipe to be insulated has proved to be another important property in technical use. This is especially critical, because an uncompressed foamed material is involved. Furthermore, the foaming agent components employed should comply with recent ecological findings and be CFC-free.

An operation which runs without problems for a longer period was still not provided by the process of rotational casting described in German Offenlegungschrift 4,118,362. The reaction mixture leading to the rigid polyurethane foam, for example, suddenly no longer exhibits flowability after a short machine operation of approximately 7 minutes, which results in clogging of the discharge nozzle. A continuous processing is consequently impossible. However, the continuous and constant rotational coating of pipes of any length and the subsequent coating thereof with a thermoplastic covering is nevertheless a requirement for technical use.

Surprisingly, the use according to the invention of two different cross-linking agents as reagents in the production of rigid polyurethane foams for the rotational casting process has proved successful. The foams also possess good tensile and shear properties.

DESCRIPTION OF THE INVENTION

The present invention provides a process for insulating pipes by applying a rigid polyurethane foam as an insulating layer and optionally an external top coating following the rotational casting process, wherein the rigid polyurethane foam is obtained by reacting a) an aromatic polyisocyanate with b) an organic compound having a molecular weight of from 92 to 1,000, containing on average at least 3 hydroxyl groups and c) an aliphatic, cycloaliphatic or aromatic polyamine and/or polyimine having a molecular weight of from 32 to 1,000 as the cross-linking agent in the presence d) of a blowing agent and optionally in the presence of e) known auxiliary substances and additives, wherein f) compounds having molecular weights of from about 166 to about 1,000, and preferably from about 200 to about 500 and being of the general formula

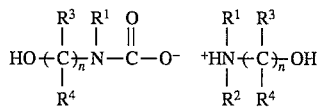

wherein n represents an integer between 2 and 9, preferably 2 and 3, $R^1$ signifies hydrogen, a $C_1$–$C_9$ alkyl radical or a

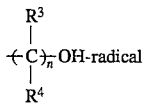

$R^2$ signifies hydrogen, and $R^3$ and $R^4$ signify hydrogen or methyl, are used as additional cross-linking agents.

There are several preferred embodiments of the present invention. It is preferred that a mixture of diphenylmethane diisocyanates and polyphenyl polyisocyanates be used as the aromatic polyisocyanate. It is also preferred that the carbamates of ethanolamine, diethanolamine, isopropanolamine, propanolamine, N-methylethanolamine, or diisopropanolamine be used as the cross-linking agent f). It is preferred that the crosslinking agent c) contains from 2 to 10 primary amino groups per molecule. It is also preferred that the cross-linking agent c) contains from 1 to 5 primary and from 1 to 10 secondary amino groups. It is also preferred that the cross-linking agent c) contains tertiary nitrogen atoms and primary and/or secondary amino groups.

$C_3$–$C_6$ hydrocarbons are preferably used as the blowing agent d), with pentane and/or cyclopentane being most preferred. In the most preferred embodiment, carbon dioxide is used as an additional blowing agent.

A thermoplastic top coating is preferably applied to the rigid polyurethane foam and the thermoplastic top coating is most preferably selected from the group consisting of polypropylene, polyethylene, polystyrene, polybutene, copolymers based on styrene/acrylonitrile/acrylic ester or acrylonitrile/butadiene/styrene, polyamides, polyesters, polyurethanes and polycarbonates.

The starting components required for producing the rigid polyurethane foams herein are a) aromatic polyisocyanates, b) hydroxyl functional compounds, c) amine and/or imine crosslinking agents, d) blowing agent, and f) the carbamates Useful polyisocyanates are described, for example, by W. Siefken in Justus Liebigs Annalen der Chemie, 562, pages 75 to 136. For example, useful isocyanates are those of the formula $$Q(NCO)_n$$

wherein n equals 2 to 4, preferably 2 and 3, and

Q signifies an aromatic hydrocarbon radical having 6 to 15, preferably 6 to 13 C atoms.

Specific polyisocyanates are described in German Offenlegungschrift 2,832,253, pages 10 to 11.

The commercially accessible polyisocyanates are particularly preferred. Such isocyanates include, for example, 2,4- and 2,6-tolylene diisocyanate and mixtures of these isomers ("TDI"); mixtures of diphenylmethane diisocyanates and polyphenyl polymethylene polyisocyanates, which are prepared by aniline-formaldehyde condensation and subsequent phosgenation ("crude MDI"); and polyisocyanates containing carbodiimide groups, urethane groups, allophanate groups, isocyanurate groups, urea groups or biuret groups ("modified polyisocyanates").

The said polyisocyanates are reacted with the components b), c) and f).

Component b) comprises compounds known per se, having molecular weights of from 92 to 1,000 and on average at least three hydroxyl groups. Such compounds include, for example, polyether polyols which have been prepared by addition of propylene oxide and/or ethylene oxide to starters such as sorbitol, ethylene glycol, trimethylolpropane, glycerol, pentaerythritol and/or sugar. These preferably have an OH number of 300 to 600. The polyester polyols known per se are also suitable according to the invention.

Component c) comprises an aliphatic, cycloaliphatic or aromatic polyamine and/or polyimine having a molecular weight of from 32 to 1,000 as the cross-linking agent. Specific useful compounds include bifunctional amines and imines such as: ethylenediamine, propylene-diamine, butylenediamine, pentamethylenediamine, hexamethylene-diamine and higher homologues thereof, 1,4-diaminocyclohexane, isophoronediamine, bis(4-aminocyclohexyl)-methane, piperazine, bis(2-aminoethyl)piperazine, bis(3-aminopropyl)-piperazine, 2-aminoethyl-piperazine, 3-aminopropylpiperazine, N,N'-dimethylethylenediamine, diethyltoluylenediamine and the like. Higher fuctional amines and imines are also useful herein and include: diethylenetriamine, triethylene-tetramine, tetraethylenepentamine, pentaethylenehexamine and other higher homologues of this series, dipropylenetriamine and higher homologues such as tripropylenetetramine, tetrapropylenepentamine, pentapropylenehexamine, tris(3-aminopropyl)amine, 2-(5-aminopentyl)-2H-azepine, tetra(3-aminopropyl)ethylenediamine, bis(3-aminopropyl)-N,N-ethylenediamine, bis(3-aminopropyl)-N,N'-ethylenediamine, tris(2-aminoethyl)amine, and the like. The cross-linking agents c) are generally employed in quantities of from 0.1 to 10, preferred form 1.0 to 7.5 parts by weight, based upon 100 parts by weight of component b).

Apart from water which, as is generally known, liberates $CO_2$ through reaction with isocyanates, highly volatile organic substances are suitable as blowing agents, for example, perhalogenated and partly halogenated hydrocarbons boiling within the temperature range of from $-50°$ C. to $+75°$ C., preferably from $+10°$ C. to $50°$ C., at a pressure of 1013 mbar, such as 1,1-dichloro-1-fluoroethane (R141b), chlorodifluoro-methane (R22), 1-chloro-1,1difluoroethane (R142b), 1,1,1,2-tetrafluoro-ethane (R134a) and aliphatic or cycloaliphatic $C_3$–$C_6$ hydrocarbons, such as propane, butane, n-pentane, isopentane, cyclopentane and cyclohexane.

Compounds of the above-mentioned general formula are used as the additional cross-linking agent f). Examples of specific compounds include carbamates of aminoethanol, 3-aminopropanol, isopropanol-amine, diethanolamine, N-methylethanolamine, diisopropanolamine, 2-hydroxycyclohexylamine, N-cyclohexylethanolamine, 3-hydroxybutyl-amine, 2-amino-2-methylpropanol, and N-(2-hydroxypropyl)cyclohexyl-amine. The hydroxyfunctional oligoamines, diamines and monoamines blocked by carbon dioxide may, of course, also be used as cross-linking agents. However, the carbamates noted above are superior for technical processing.

The cross-linking agents f) are generally used in amounts of from 0.1 to 15 parts by weight (preferably from 1.0 to 10 parts by weight) based upon 100 parts by weight of the polyol component b).

The components b), c), d), e) and f) together constitute the so-called "polyol side" which is reacted with the polyisocyanate component a).

The isocyanate index range is in general from about 100 to about 300, preferably from about 105 to about 130.

Suitable auxiliary substances and additives can optionally be used (component e) include, for example, emulsifiers and foam stabilizers. Preferred emulsifiers are those based on alkoxylated fatty acids and higher alcohols. Polyether siloxanes, especially those which are insoluble in water, are primarily suitable as foam stabilizers. These compounds are generally structured in such a way that a copolymer of ethylene oxide and propylene oxide is bonded with a polydimethylsiloxane radical. Water-soluble foam stabilizers are known and are described, for example, in U.S. Pat. Nos. 2,834,748, 2,917,480 and 3,629,308.

According to the invention, the catalysts known per se from polyurethane chemistry, such as tertiary amines and/or organometallic compounds, may also be contained in the polyol side. The polyol side may also contain retarding agents, for example, acid reacting substances such as hydrochloric acid or organic acid halides; also cell regulators of a type known per se such as paraffins or fatty alcohols or dimethylpoly-siloxanes; pigments or dyes; stabilizers against the influences of ageing and weathering; softeners; fungistatic and bacteriostatic substances; and fillers such as barium sulphate, kieselguhr, carbon black or whitening.

Further examples of surface-active additives, foam stabilizers, cell regulators, retarding agents, stabilizers, flame retardants, softeners, dyes, fillers and fungistatic and bacteriostatic substances to be used optionally according to the invention, together with particulars concerning the method of application and mechanism of action of the said additives, are known and described, for example, in Kunststoff-Handbuch, Volume VII, published by Vieweg and Höchtlen, Carl Hanser Verlag, Munich, 1966, for example, on pages 103 to 113 and in the new edition dated 1993.

The process according to the invention provides not only a rising and flow of the raw material mixture suitable for rotation, but also a most favorable spectrum of properties as regards important criteria for the application, such as 1) good bonding of the uncompressed foamed material to the pipe; 2) good tensile and shear strength; 3) dimensional stability of the foamed material, and 4) thermal conductivity.

Finally, the foamed material is frequently provided with a thermoplastic top coating. The thermoplastic top coating selected can be based on a polyurethane elastomer, on polyolefin thermoplastics having suitable heat resistance such as polyethylene, polypropylene, polybutylene, polyisobutylene, on styrene/acrylonitrile/acrylic ester copolymers and acrylonitrile/butadiene/styrene copolymers, on polyamides or polyesters or polycarbonates.

The application of the rigid polyurethane foam layer and an external top coating is generally carried out in one single operation. The thermoplastic top coating is generally applied prior to the time where the rigid polyurethane foam has achieved its final stability, but after it has reached its final foam thickness. The rigid polyurethane foam layer and the thermoplastic top coating are generally applied by means of mixing heads and casting nozzles, with the feed from the mixing heads taking place either at a specified distance of the mixing heads parallel to the axis of rotation or the pipe being moved axially under a specified feed from firmly positioned mixing heads.

In the process of the invention, a pipe is placed on an appropriate unit according to its diameter and set in rotation at a specified number of revolutions per minute. Depending on the required thickness of the insulating layer, the rigid foam reaction mixture is passed through the slot nozzle at a specified feed rate from the mixing head. Different nozzle geometries, preferably slot nozzles, must be employed for different quantities of output. If the rigid foam has attained its insulating thickness, the application of the top coating commences in the same operation. The feed from the mixing head for each of the rigid foam and the top coating can take place at identical or different rates if the pipe is clamped while rotating. If the rotating pipe is moved in the direction of the longitudinal axis, the mixing heads must be firmly positioned at a given distance. The output of the reaction mixture for the rigid foam and the top coating is suitably adjusted so that the rates of feed are identical for both mixing heads. Appropriate nozzle geometries, preferably slot nozzles, are also employed for casting the top coating.

During processing, the polyol side is maintained as a rule at a temperature of 40° C. and the isocyanate component is maintained as a rule at a temperature of 30° C.

The invention is further illustrated but is not intended to be limited by the following examples in which all parts and percentages are by weight unless otherwise specified.

EXAMPLES

A) Preparation of the cross-linking agent, component f
Carbamate 1

$CO_2$ is introduced into 750 g (10 m) of 3-aminopropanol-1 to saturation point, with approximately 5 m being taken up.

Analysis of $C_7H_{18}N_2O_4$ (194)

reported: C: 43.2%, H: 9.2%, N: 14.4%;

found: C: 43.1%, H: 9.1%, N: 14.8%;

Viscosity: 45,000 mPa•s (25° C.).

Carbamate 2

$CO_2$ is introduced into 610 g (10 m) of aminoethanol to saturation point, with approximately 5 m being taken up.

Analysis of $C_5H_{14}N_2O_4$ (166)

reported: C: 36.1%, H: 9.4%, N: 16.8%;

found: C: 35.9%, H: 8.6%, N: 17.0%;

Viscosity: 22,000 mPa•s (25° C.).

Carbamate 3

$CO_2$ is introduced into 750 g (10 m) of N-methylethanolamine to saturation point, with approximately 5 m being taken up.

Analysis of $C_7H_{18}N_2O_4$ (194)

reported: C: 43.2%, H: 9.2%, N: 14.4%;

found: C: 43.0%, H: 8.8%, N: 14.7%;

The carbamate freezes crystalline. Fp.: 50° C.

Carbamate 4

$CO_2$ is introduced into 750 g (10 m) of isopropanolamine to saturation point, with approximately 5 m being taken up.

Analysis of $C_7H_{18}N_2O_4$ (194)

reported: C: 43.2%, H: 9.2%, N: 14.4%;

found: C: 42.9%, H: 8.8%, N: 14.9%;

Viscosity: 150,000 mPa•s (25° C.).

Carbamate 5

$CO_2$ is introduced into 1,050 g (10 m) of diethanolamine to saturation point, with approximately 5 m being taken up.

Analysis of $C_9H_{22}N_2O_6$ (254)

reported: C: 42.5%, H: 8.6%, N: 11.0%;

found: C: 43.0%, H: 8.0%, N: 11.5%;

B) Cross-linking agent component c 1. 1,6,11-triaminoundecane
2. tetraethylenepentamine
3. tris(2-aminopropyl)amine C) Production of foamed material

EXAMPLE C1

The polyol side consisted of 45 parts by weight a polyether polyol produced by reacting sucrose with propylene oxide, and having an OH number of 450 and a molecular weight of 350, 45 parts by weight a polyether polyol produced by reacting a mixture of sorbitol glycerine (weight ratio of 1:1) with propylene oxide and having an OH number of 450 and a molecular weight of 570, 5.0 parts by weight glycerine, 8.0 parts by weight cyclopentane, 2.0 parts by weight silicon stabilizer B 8423, commercially available from Goldschmidt AG, Essen, 5.8 parts by weight Desmorapid 726 b, a commercially available catalyst from Bayer AG, Germany, 4.5 parts by weight cross-linking agent A 2, 1.9 parts by weight amine cross-linking agent B 2.

The polyol side was reacted with 150 parts by weight of Desmodur 44 V 20, a polymethylene poly(phenyl isocyanate) having an NCO content of 31.5% by weight, commercially available from Bayer AG, Germany.

The discharge of raw materials takes place through a slot nozzle, 125 mm long and 0.5 mm wide having an output of 5 kg/min., onto a steel pipe rotating at a rate of 20 m/min.

Following an endurance trial (length of time of the trial >5 hours), the discharged foamed material had flow properties and rising capacity of such a kind that it yielded an adhering, finely-celled foamed material, free of gas bubbles, having an insulating thickness of 40 mm and a slightly undulating surface, despite any running of the foamed material mixture from the pipe and nozzle, and without clogging of the nozzles. Subsequently, a thermoplastic skin of polyethylene having a density of 0.95 $g/cm^3$ was applied through an extruder. The bonding between foam and thermoplastic layer was perfect. The bulk density of the foamed material was 80 $kg/m^3$.

Properties of the foamed material are shown in Tables 1 and 2.

EXAMPLE C2

The polyol side consisted of 45 parts by weight a polyether polyol produced by reacting sucrose with propylene oxide, and having an OH number of 450 and a molecular weight of 350, 45 parts by weight a polyether polyol produced by reacting a mixture of sorbitol glycerine (weight ratio of 1:1) with propylene oxide and having an OH number of 450 and a molecular weight of 570, 5.0 parts by weight glycerine, 8.0 parts by weight cyclopentane, 2.0 parts by weight silicon stabilizer B 8423, commercially available from Goldschmidt AG, Essen, 5.8 parts by weight Desmorapid 726 b, a commercially available catalyst from Bayer AG, Germany, 6.9 parts by weight cross-linking agent A 5, 2.5 parts by weight amine cross-linking agent B 1.

The polyol side was reacted with 155 parts by weight of the same isocyanate used in Example C1.

Processing was carried out as in Example C 1. Here also, following the endurance trial, a foamed material was obtained having good properties without defects in the transverse section of the foamed material. A thermoplastic top coating of polyethylene having a density of 0.95 g/cm$^3$ was subsequently applied through an extruder.

The bonding between pipe, foam layer and top coating was perfect. Bulk density of foamed material was 80 kg/m$^3$.

Properties of the foamed material are shown in Tables 1 and 2.

EXAMPLE C3

The polyol side consisted of 45 parts by weight a polyether polyol produced by reacting sucrose with propylene oxide, and having an OH number of 450 and a molecular weight of 350, 45 parts by weight a polyether polyol produced by reacting a mixture of sorbitol glycerine (weight ratio of 1:1) with propylene oxide and having an OH number of 450 and a molecular weight of 570, 5.0 parts by weight glycerine, 8.0 parts by weight cyclopentane, 2.0 parts by weight silicon stabilizer B 8423, commercially available from Goldschmidt AG, Essen, 5.8 parts by weight Desmorapid 726 b, a commercially available catalyst from Bayer AG, Germany, 6.2 parts by weight cross-linking agent A 5, 0.9 parts by weight cross-linking agent B 3, 1.0 part by weight amine cross-linking agent B 1.

The polyol side was reacted with 155 parts by weight of the same isocyanate used in Example C1.

Processing was carried out as in Example C 1. Here also, following the endurance trial, a foamed material having an almost smooth surface was obtained, without defects nor escape of foamed material. A polyethylene skin was subsequently applied through an extruder. The bulk density of foamed material was 80 kg/m$^3$.

Properties of the foamed material are shown in Tables 1 and 2.

EXAMPLE C4 (Comparison)

The polyol side consisted of 45 parts by weight a polyether polyol produced by reacting sucrose with propylene oxide, and having an OH number of 450 and a molecular weight of 350, 45 parts by weight a polyether polyol produced by reacting a mixture of sorbitol glycerine (weight ratio of 1:1) with propylene oxide and having an OH number of 450 and a molecular weight of 570, 5.0 parts by weight glycerine, 8.0 parts by weight cyclopentane, 0.5 parts by weight water, 5.8 parts by weight Desmorapid 726 b, a commercially available catalyst from Bayer AG, Germany, 3.8 parts by weight cross-linking agent B 2.

The polyol side was reacted with 158 parts by weight of the same isocyanate used in Example C1.

Processing was carried out as in Example C 1. Initially, the foamed material formed corresponded in many respects with the spectrum of properties of the foamed material in Example C 1, but after approximately 7 minutes of operating time, a partial break in the flow of raw material suddenly resulted. Because of this, there arose a coarse cellular structure which was largely open-celled; after a further 2 minutes, the discharge of the raw material is no longer possible. The nozzles were no longer capable of functioning. The properties of the foam are shown in Tables 1 and 2.

EXAMPLE 5(Comparison)

The polyol side consisted of 45 parts by weight a polyether polyol produced by reacting sucrose with propylene oxide, and having an OH number of 450 and a molecular weight of 350, 45 parts by weight a polyether polyol produced by reacting a mixture of sorbitol glycerine (weight ratio of 1:1) with propylene oxide and having an OH number of 450 and a molecular weight of 570, 5.0 parts by weight glycerine, 8.0 parts by weight cyclopentane, 5.8 parts by weight Desmorapid 726 b, a commercially available catalyst from Bayer AG, Germany, 4.5 parts by weight cross-linking agent A 2.

The polyol side was reacted with 158 parts by weight of the same isocyanate used in Example C1.

Processing was carried out as in Example C 1. The foaming polyurethane mixture ran off the pipe after rotating by 90°. Neither the bonding nor the stability of the foamed material fulfills the requirements of the rotational casting process.

A further assessment of properties is given in Tables 1 and 2.

TABLE 1

| | PROPERTIES OF FOAMED MATERIALS | | | |
|---|---|---|---|---|
| Foam No. | Compressive strength (MPa)[4] | Shear Strength (MPa)[4] tangential at 23° C. | Water Uptake in the boiling test[4] (Vol %) | Thermal conductivity (W/mK) DIN 52613 |
| C1 | 0.6 | 0.60 | 5.0 | 27 |
| C2 | 0.65 | 0.62 | 4.0 | 27 |
| C3 | 0.58 | 0.51 | 4.8 | 27 |
| C4 | 0.55[1] | 0.35[1] | 8.0[1] | 29[1] |
|    | 0.28[2] | 0.21[2] | 13.0[2] | 31[2] |
| C5 | * | * | * | * |

[1]Up to an operating time of 5 minutes
[2]From an operating time of 7 minutes up to 9 minutes
*Not assessable, as a rotational coating was not achieved

TABLE 2

| Foam No. | Bonding | Flow of the single strands | Cell appearance | Open cells (%) |
|---|---|---|---|---|
| C1 | Very good | Very good | Very fine | 6 |
| C2 | Very good | Very good | Very fine | 8 |
| C3 | Very good | Very good | Very fine | 9 |
| C4 | Good[1] | Poor | Average[1] Coarse[2] | 12[1] 17[2] |
| C5 | None | Good[3] | * | * |

[4] Testing in accordance with European Standard EN 253
[3] After a rotation of 90° however associated with a running off Only the combination of cross-linking agents according to the invention in the Examples C 1 to C 3 fulfills the required endurance run properties combined with the mechanical properties of the rotational coating.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for insulating pipes by applying a rigid polyurethane foam-forming reaction mixture as an insulating layer and optionally applying an external top coating, with both the insulating layer and the top coating being applied by a rotational casting process, the improvement wherein said foam-forming reaction mixture comprises:

a) an aromatic polyisocyanate with
   b) an organic compound having a molecular weight of from 92 to 1,000, containing on average at least 3 hydroxyl groups and
   c) an aliphatic, cycloaliphatic or aromatic polyamine and/or polyimine having a molecular weight of from 32 to 1,000 as a cross-linking agent in the presence
   d) of a blowing agent, and optionally in the presence of
   e) known auxiliary substances and additives wherein said reaction mixture also contains
   f) one or more compounds having a molecular weight of from about 166 to about 1,000 and being of the general formula

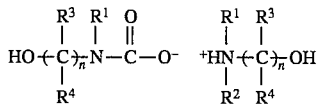

wherein n represents an integer between 2 and 9, $R^1$ signifies hydrogen, a $C_1$–$C_9$ alkyl radical or a

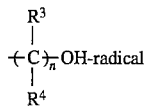

$R^2$ signifies hydrogen, and $R^3$ and $R^4$ signify hydrogen or methyl.

2. The process of claim 1, wherein a mixture of diphenylmethane diisocyanates and polyphenyl polyisocyanates is used as the aromatic polyisocyanate.

3. The process of claim 1, wherein component f) is selected from the group consisting of carbamates of ethanolamine, diethanol-amine, isopropanolamine, propanolamine, N-methylethanolamine, and diiso-propanolamine.

4. The process of claim 1, wherein component c) is a compound containing from 2 to 10 primary amino groups.

5. The process of claim 1, wherein component c) is a compound containing from 1 to 5 primary and 1 to 10 secondary amino groups.

6. The process of claim 1, wherein component c) is a compound containing tertiary nitrogen atoms and primary and/or secondary amino groups.

7. The process of claim 1, wherein component d) is a $C_3$–$C_6$ hydrocarbon.

8. The process of claim 7, wherein component d) is pentane and/or cyclopentane.

9. The process of claim 1, wherein a thermoplastic top coating is applied to the rigid polyurethane foam.

10. The process of claim 9, wherein said thermoplastic top coating is selected from the group consisting of polypropylene, polyethylene, polystyrene, polybutene, copolymers based on styrene/acrylonitrile/acrylic ester or acrylonitrile/butadiene/styrene, polyamides, polyesters, polyurethanes and polycarbonates.

11. The process of claim 1, wherein n is either 2 or 3.

* * * * *